(12) United States Patent
Wei et al.

(10) Patent No.: US 10,749,703 B2
(45) Date of Patent: Aug. 18, 2020

(54) INFORMATION PROCESSING METHOD AND DEVICE, AND COMPUTER STORAGE MEDIUM

(71) Applicant: ZTE CORPORATION, Shenzhen (CN)

(72) Inventors: Yuehua Wei, Shenzhen (CN); Zheng Zhang, Shenzhen (CN); Min Xiao, Shenzhen (CN); Cui Wang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/089,102

(22) PCT Filed: Oct. 19, 2017

(86) PCT No.: PCT/CN2017/106882
§ 371 (c)(1),
(2) Date: Sep. 27, 2018

(87) PCT Pub. No.: WO2018/072732
PCT Pub. Date: Apr. 26, 2018

(65) Prior Publication Data
US 2019/0132143 A1 May 2, 2019

(30) Foreign Application Priority Data
Oct. 20, 2016 (CN) .......... 2016 1 0915629

(51) Int. Cl.
*H04L 12/18* (2006.01)
*H04L 12/801* (2013.01)
*H04L 12/761* (2013.01)

(52) U.S. Cl.
CPC ...... *H04L 12/1886* (2013.01); *H04L 12/1877* (2013.01); *H04L 45/16* (2013.01);
(Continued)

(58) Field of Classification Search
CPC ..... H04L 12/18; H04L 12/721; H04L 12/761; H04L 12/801; H04L 12/927;
(Continued)

(56) References Cited

U.S. PATENT DOCUMENTS 8,140,654 B2 * 3/2012 Sultan ................. H04L 12/4641
709/223
9,100,285 B1 * 8/2015 Choudhury ............. H04L 45/26
(Continued)

FOREIGN PATENT DOCUMENTS

CN 103236941 A 8/2013
CN 103812769 A 5/2014
(Continued)

OTHER PUBLICATIONS

"Encapsulation Considerations"; Mar. 2016; E. Nordmard, A. Tian, J. Gross, J. Hudson, L. Kreeger, P. Garg, P. Thaler, and T. Herbert; Draft-ieff-rtgwe-dt-encap-01, Internet Engineering Task Force, Standard Working Draft, Internet Society, Geneva, Switzerland, 42 pgs.
(Continued)

*Primary Examiner* — Tri H Phan
(74) *Attorney, Agent, or Firm* — Li & Cai Intellectual Property (USA) Office

(57) ABSTRACT

The present disclosure relates to an information processing method, comprising: encapsulating, in a link layer discovery protocol data unit (LLDPDU), bit indexed explicit replication (BIER) bit string length information of a first node; and sending to a second node the LLDPDU, wherein the second node is an adjacent node of the first node, and the BIER bit string length information of the first node is used to forward BIER traffic. The present disclosure also relates to an information processing device.

20 Claims, 4 Drawing Sheets

(52) U.S. Cl.
CPC .......... *H04L 47/35* (2013.01); *H04L 2212/00* (2013.01); *Y02D 30/30* (2018.01); *Y02D 30/32* (2018.01)

(58) Field of Classification Search
CPC . H04L 12/1877; H04L 12/1886; H04L 45/16; H04L 47/35; H04L 2212/00; Y02D 30/30; Y02D 30/32
See application file for complete search history.

(56) References Cited

U.S. PATENT DOCUMENTS

| | | | | |
|---|---|---|---|---|
| 9,743,367 | B2* | 8/2017 | Das | H04W 56/001 |
| 9,900,217 | B2* | 2/2018 | Gourlay | H04L 41/0893 |
| 9,917,845 | B2* | 3/2018 | Wang | H04L 12/6418 |
| 10,084,656 | B2* | 9/2018 | Zhan | H04L 45/66 |
| 10,193,802 | B2* | 1/2019 | Zaidi | H04L 47/24 |
| 10,225,090 | B2* | 3/2019 | Wijnands | H04L 12/1886 |
| 10,341,222 | B2* | 7/2019 | Eckert | H04L 69/22 |
| 10,404,482 | B2* | 9/2019 | Wijnands | H04L 45/54 |
| 2008/0270588 | A1 | 10/2008 | Sultan | |
| 2008/0291922 | A1 | 11/2008 | Sultan | |
| 2013/0176892 | A1 | 7/2013 | Shukla | |
| 2015/0023215 | A1 | 1/2015 | Zhan et al. | |
| 2015/0078377 | A1 | 3/2015 | Wijnands et al. | |
| 2015/0078378 | A1 | 3/2015 | Wijnands et al. | |
| 2015/0078379 | A1 | 3/2015 | Wijnands et al. | |
| 2015/0078380 | A1 | 3/2015 | Wijnands et al. | |
| 2015/0131660 | A1 | 5/2015 | Shepherd et al. | |
| 2016/0014142 | A1 | 1/2016 | Wang et al. | |
| 2016/0254987 | A1 | 9/2016 | Eckert et al. | |
| 2016/0254988 | A1 | 9/2016 | Eckert et al. | |
| 2016/0254991 | A1 | 9/2016 | Eckert et al. | |
| 2017/0302546 | A1 | 10/2017 | Zheng et al. | |
| 2018/0205636 | A1* | 7/2018 | Hu | H04L 45/16 |
| 2018/0227225 | A1* | 8/2018 | Zhai | H04L 29/08 |

FOREIGN PATENT DOCUMENTS

| | | |
|---|---|---|
| CN | 104009937 A | 8/2014 |
| CN | 104811387 A | 7/2015 |
| CN | 105556899 A | 5/2016 |
| CN | 105812197 A | 7/2016 |
| CN | 105933228 A | 9/2016 |
| WO | 2014127633 A1 | 8/2014 |

OTHER PUBLICATIONS

"Link Layer Discovery Protocol and MIB"; Jul. 2002, Paul Congdon, lldp-protocol-02, IEEE Draft; vol. 802.1, 26 pgs.
"Link Layer Discovery Protocol and TIA LLDP-MED Extensions" Mar. 2014; IEEE Draft; Siepon_1403_Elbakoury_1, IEEE-SA, vol. 802.1, 37 pgs.
Multicast using Bit Index Explicit Replication; Jul. 2016, I.J. Wijanads, E. Rosen, A. Dolganow, T. Przygiends, and S. Aldrin; draft-ietf-bier-architecture-04.txt, Internet Draft; Internet Engineering Task Force, IETF; Standard Working Draft, Internet Society (I SOC) 4, 36 pgs.
"IS-IS Extension for BIER-Lite"; Oct. 2015; C. Wang and Z. Zhang; draft-wang-isis-bier-lite-extension-00.txt. Internet Engineering Task Force,IETF; Standard Working Draft, Internet Society (ISOC) 4, 14 pgs.
"Multicast using Bit Index Explicit Replication; draft-ietf-bier-architecture-03", Jan. 2016; IJ. Wijnanfs, E. Rosen, A. Dolganow, T. Przygienda and S. Aldrin, Internet Engineering Task Force Internet-Draft Intended status: Standards Track, 1 pg.
IEEE standard for local and metropolitan area networks "Station and Media Access Control Connectivity Discovery", Sep. 2009, IEEE Computer Society, IEEE Std. 802.1AB-2009 802.1AB-2009, 204 pgs.
IEEE standard for local and metropolitan area networks "Station and Media Access Control Connectivity Discovery", May 2005; IEEE Computer Society, IEEE 802.1AB-2005, 172 pgs.
Supplementary European Search Report in the European application No. 17861776.7, dated Apr. 8, 2019, 12 pgs.
International Search Report in the international application No. PCT/CN2017/106882, dated Dec. 7, 2017, 2 pgs.
English translation of the Written Opinion of the International Search Authority in the international application No. PCT/CN2017/106882, dated Dec. 7, 2017, 3 pgs.
China Patent Office, First Office Action dated Apr. 10, 2020 corresponding to Chinese Application No. 201610915629.8.
European Patent Office, Office Action dated Mar. 9, 2020 corresponding to EP Application No. 17861776.7.

* cited by examiner

INFORMATION PROCESSING METHOD AND DEVICE, AND COMPUTER STORAGE MEDIUM

TECHNICAL FIELD

The disclosure relates to communication technologies, and particularly to an information processing method, device and computer storage medium.

BACKGROUND

Multicast technologies play an increasingly significant role in the present internet. An interactive personality television (IPTV), a net-meeting, a live broadcast and the like all use the multicast technologies.

However, with the development of technology, the present development direction tends to not run conventional multicast protocols (i.e., the existing multicast protocols including a protocol Independent Multicast (PIM), an internet Control Message Protocol (IGMP), a multicast listener discovery protocol (MLD) and the like) in a backbone network, but relies on other technologies to implement a transmission of multicast traffic. Technologies that are commonly used include a bit indexed explicit replication (BIER) technology and the like.

The BIER technology is used for multicast forwarding, multicast states of intermediate nodes in a network are removed, and the multicasting forwarding can be performed only according to a BIER bit string to reach corresponding destination nodes. Thus, a control of the network is greatly simplified.

However, in a layer 2 network, since there is no effective means for advertising bit string length support information of each forwarding node, error handling may occur during the multicast forwarding, and even traffic may be lost.

SUMMARY

In order to solve the existing technical problems, the embodiments of the present disclosure provide an information processing method and device.

Technical solutions of the embodiments of the present disclosure are implemented as follows.

The embodiments of the present disclosure provide an information processing method, applied to a first node. The method includes that bit indexed explicit replication (BIER) bit string length information of the first node is encapsulated into a link layer discovery protocol data unit (LLDPDU); and the LLDPDU is sent to a second node, the second node is an adjacent node of the first node. Herein, the BIER bit string length information of the first node is used in forwarding of BIER traffic.

According to an exemplary embodiment, the BIER bit string length information of the first node is identified by a new type of type-length-value (TLV) defined by a link layer discovery protocol (LLDP).

According to an exemplary embodiment, a value of the BIER bit string length information identified by the new type of TLV is at least one specific bit string length value.

According to an exemplary embodiment, a value of the BIER bit string length information identified by the new type of TLV occupies one byte, each bit in the one byte identifies a bit string length value.

According to an exemplary embodiment, a value of the BIER bit string length information identified by the new type of TLV occupies at least two bytes, each of the at least two bytes identifies a bit string length value or a specific number of bits in the at least two bytes identify a bit string length value.

According to an exemplary embodiment, the method further includes that the BIER bit string length information of the first node is acquired according to configuration information of the first node itself.

According to an exemplary embodiment, the method further includes that the BIER bit string length information of the first node is acquired according to BIER bit string length information of the first node which is received from a controller.

The embodiments of the present disclosure further provide an information processing method, applied to a second node. The method includes that a link layer discovery protocol data unit (LLDPDU) sent by a first node is received; the LLDPDU is parsed to acquire BIER bit string length information of the first node; and forwarding of BIER traffic is performed according to the BIER bit string length information of the first node. Herein, the first node is an adjacent node of the second node.

According to an exemplary embodiment, the BIER bit string length information of the first node is identified by a new type of type-length-value (TLV) defined by a link layer discovery protocol (LLDP).

According to an exemplary embodiment, the forwarding of BIER traffic is performed according to the BIER bit string length information of the first node includes that bit string length information of a BIER header is modified according to the BIER bit string length information of the first node.

The embodiments of the present disclosure further provide an information processing device. The device includes that an encapsulating unit, configured to encapsulate bit indexed explicit replication (BIER) bit string length information of a first node into a link layer discovery protocol data unit (LLDPDU); and a sending unit, configured to send the LLDPDU to a second node, the second node is an adjacent node of the first node. Herein, the BIER bit string length information of the first node is used in forwarding of BIER traffic.

According to an exemplary embodiment, the device further includes an acquisition unit, configured to acquire the BIER bit string length information of the first node according to configuration information of the first node itself.

According to an exemplary embodiment, the device further includes an acquisition unit, configured to acquire the BIER bit string length information of the first node according to BIER bit string length information of the first node which is received from a controller.

The embodiments of the present disclosure further provide an information processing device. The device includes that a receiving unit, configured to receive a link layer discovery protocol data unit (LLDPDU) sent by a first node; a parsing unit, configured to parse the LLDPDU to acquire bit indexed explicit replication (BIER) bit string length information of the first node; and a forwarding unit, configured to perform forwarding of BIER traffic according to the BIER bit string length information of the first node. Herein, the first node is an adjacent node of the second node.

According to an exemplary embodiment, the forwarding unit is specifically configured to modify bit string length information of a BIER header according to the BIER bit string length information of the first node.

The embodiments of the present disclosure further provide a computer storage medium having stored thereon one or more programs that when executed by a computer, cause the computer to perform any one of the above information processing methods or a combination thereof.

In the information processing method and device according to the embodiments of the present disclosure, a first node encapsulates BIER bit string length information of the first node into a LLDPDU, and sends the LLDPDU to a second node, the second node is an adjacent node of the first node; the second node receives the LLDPDU sent by the first node, parses the LLDPDU to acquire the BIER bit length information of the first node, and performs forwarding of BIER traffic according to the BIER bit length information of the first node. BIER bit string length information of a node is transmitted to an adjacent node in a network through the LLDPDU, and a transmission of the BIER bit string length information of nodes in a layer 2 network may be implemented, so that a node can accurately know BIER bit string length information of an adjacent node and perform forwarding of traffic according to the BIER bit string length information of the adjacent node, thereby effectively avoiding traffic error handling or traffic loss due to inconsistent bit string length processing capabilities of the nodes.

BRIEF DESCRIPTION OF DRAWINGS

In the drawings, which are not necessarily drawn to scale, the like reference signs may represent similar components throughout different views. The like reference signs with different letter suffixes may indicate different examples of the similar components. The drawings generally illustrate the various embodiments discussed herein by way of example and not by way of limitation.

DETAILED DESCRIPTION

The present disclosure will be further described in detail below with reference to the drawings and the embodiments.

At present, protocols used by multicast technologies include a protocol Independent Multicast (PIM), an internet Control Message Protocol (IGMP), a multicast listener discovery protocol (MLD) and the like. Under initial small application scenarios, these multicast protocols can meet requirements of users. However, as multicast applications become more widespread and networking manners become more complicated, when these multicast protocols are directly applied to the internet, a large amount of control resources and signaling interactions of intermediate nodes are occupied due to excessive multicast states in a backbone network, and development of a virtual private network (VPN) technology that is widely used today cannot be well supported. At present, related technologies that can solve these problems include a multicast label distribution protocol (MLDP) technology, a point-to-multipoint traffic engineering (P2MP TE) technology, a bit indexed explicit replication (BIER) technology and the like.

The core idea of the BIER technology is that each node in a network is represented by only one bit. When multicast traffic is transmitted over an intermediate network, the multicast traffic is not presented in the form of a packet of an internet protocol (IP) that is used for interconnections between multicast networks, but is encapsulated into a specific packet header, i.e., a BIER header. This packet header identifies, in the form of bits, all destination nodes for the multicast traffic. The intermediate network routes according to the bits to ensure that the traffic can be transmitted to all the destination nodes.

When the BIER technology is used for multicast forwarding, multicast states of intermediate nodes in a network are removed, and respective destination nodes can be reached by performing the multicasting forwarding only according to a BIER bit string. Thus, a control of the network is greatly simplified. Here, BIER bit string information may be a set of bits of egress nodes for specific traffic, or may be a set of bits of intermediate links through which traffic needs to pass. Forwarding nodes participating in the forwarding need to perform a bit-by-bit matching according to the bit string and to perform the forwarding. Because of different network sizes, the set of bits of the egress nodes in the BIER header has a variable length. The length is referred to as a bit string length (BSL). For example, in smaller networks, 32 bits can be used to identify all egress nodes; and in larger networks, more bits, such as 512 bits, 1024 bits or even 4096 bits, may be used to identify information of egress nodes.

Forwarding devices often select a specific bit string length for the multicast forwarding, so that optimal forwarding efficiency is achieved.

Figure 1:
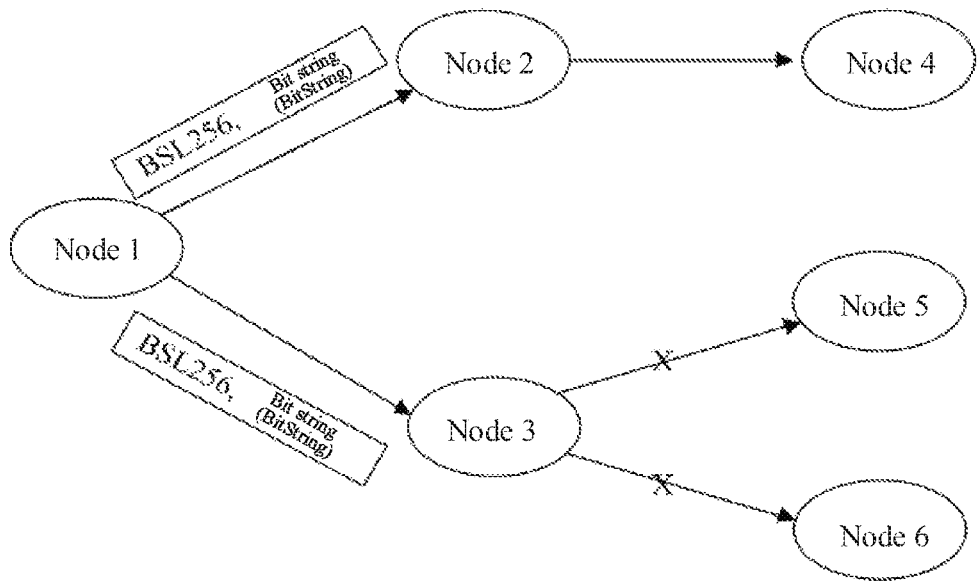
FIG. 1 is a schematic diagram of a forwarding process of a BIER packet in the related art.

The BIER technology can bring good optimization effects to multicast of a layer 3 network. Similarly, in a layer 2 network, the BIER technology can also eliminate multicast states of nodes in the layer 2 network, which also brings great optimization effects. However, in the layer 2 network, there is no effective means for advertising bit string length support information of each forwarding node, so that black holes are likely to occur during the forwarding, resulting in traffic loss. For example, two adjacent forwarding nodes are implemented by different manufacturers, respectively, or two adjacent forwarding nodes span different types of networks, so a bit string length of the BIER header that supported by one of the two adjacent forwarding nodes is inconsistent with a bit string length of the BIER header that supported by the other of the two adjacent forwarding nodes. One forwarding node uses 256 bits for the forwarding, and the other forwarding node only supports 128-bit processing capability to a maximum extent. In such a case, when the two forwarding nodes forward the BIER traffic, traffic handling error or even traffic loss is caused because the bit string length information of the BIER header that supported by one of the two adjacent forwarding nodes does not match with the bit string length information in the BIER header supported by the other of the two adjacent forwarding nodes. In detail, as illustrated in FIG. 1, it is assumed that the BIER technology is used for packet forwarding in the layer 2 network illustrated in FIG. 1. When an upstream node Node 1 forwards a packet, the Node 1 transmits the packet to downstream nodes Node 2 and Node 3 in an encapsulation manner of a BIER header with a bit string length of 256 bits. When the packet is processed by the Node 2 and the Node 3, the Node 2 can forward the packet to a next node Node 4 normally because the Node 2 can locally support a bit string length, which is 256 bits, of the BIER header. However, since the Node 3 only locally supports a bit string length of 128 bits to the maximum extent, the Node 3 cannot process the packet normally, and thus the Node 3 cannot correctly forward the packet to downstream nodes Node 5 and Node 6. Or the packet is forwarded only to the downstream node Node 5 and cannot be forwarded to the Node 6 due to the error handling of the Node 3, and accordingly the traffic lost is caused. In an even worse case, the packet is forwarded to nodes to which the packet is not intended to be forwarded due to the error handling of the Node 3.

Moreover, a link layer discovery protocol (LLDP) is a vendor-neutral layer 2 protocol that allows network devices to advertise device identifiers and performances of the network devices on a local sub-network. The LLDP provides a standard link layer discovery manner. In such manner, information such as a main capability, a management address, a device identifier, an interface identifier, of a local device can be organized into different TLVs. The different TLVs are encapsulated into a LLDPDU, and the LLDPDU is distributed neighboring devices directly connected to the local device. After receiving the LLDPDU, the neighboring devices store the LLDPDU in the form of a management information base (MIB) for a network management system to query and determine a communication status of a link.

Therefore, the LLDP is a neighbor discovery protocol. The LLDP defines a standard manner for Ethernet devices (such as switches, routers and the like) and wireless local area network (WLAN) access points, so that the Ethernet devices and the WLAN access points can advertise their presences to other nodes in the network and store discovery information of each neighboring device. Detailed information, such as the device configuration and the device identifier and the like, can be advertised by using this protocol. Specifically, the LLDP defines a general advertisement information set, a protocol for transmitting advertisements, and a method for storing received advertisement information. A device that intends to advertise information of the device itself may encapsulate multiple pieces of advertisement information in a local area network (LAN) packet and transmit the packet, and a transmission form is a TLV domain.

Based on this, in various embodiments of the present disclosure, a first node encapsulates BIER bit string length information of the first node into a LLDPDU, and sends the LLDPDU to a second node, the second node is an adjacent node of the first node. Here, the BIER bit string length information of the first node is identified by a new type of TLV defined by a LLDP. The second node receives the LLDPDU sent by the first node, parses the LLDPDU to acquire the BIER bit string length information of the first node, and perform forwarding of BIER traffic according to the BIER bit string length information of the first node.

First Embodiment

Figure 2:
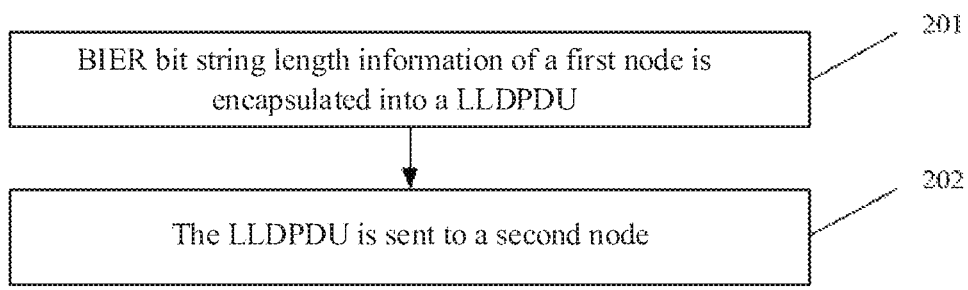
FIG. 2 is a schematic flowchart of an information processing method at a first node side according to a first embodiment of the present disclosure.

The embodiments of the present disclosure provide an information processing method, specifically, an information transmission method, and more specifically, a method for transmitting information among nodes. The method is applied to a first node. As illustrated in FIG. 2, the method includes the following operations.

At block 201, BIER bit string length information of the first node is encapsulated into a LLDPDU.

Herein, the BIER bit string length information of the first node may be identified by a new type of TLV defined by a LLDP.

Herein, in practical applications, the new type of TLV refers to a new type of TLV defined by an extension of the LLDP on the basis of an existing LLDP. The new type of TLV may be a brand new TLV, or may be a new TLV obtained by adding BIER bit string length information into an existing TLV.

According to an exemplary embodiment, a value of the BIER bit string length information identified by the new type of TLV may be at least one specific bit string length value supported by the first node.

For example, it is possible to list only a bit string length value, such as 128, that the first node most desires to process. Optionally, it is possible to list multiple bit string length values, such as 128, 256, and 512, that the first node can support. According to an exemplary embodiment, a value of the BIER bit string length information identified by the new type of TLV occupies one byte, each bit in the byte identifies a bit string length value.

Figure 3:
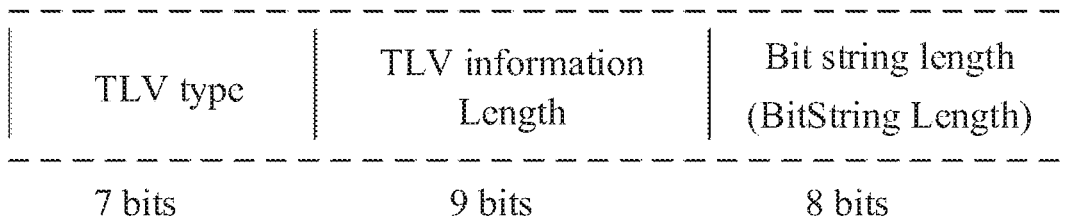
FIG. 3 is a schematic structural diagram of a new type of extended TLV according to an embodiment of the present disclosure.

For example, a TLV as illustrated in FIG. 3, a value for identifying the BIER bit string length information occupies one byte in the TLV, and each bit in the one byte is used to identify a bit string length. For example, starting from the least significant bit (i.e. the right-hand), the first bit identifies that the BIER bit string length supported by the first node is 64 bits, the second bit identifies that the BIER bit string length supported by the first node is 128 bits, and the third bit identifies that the BIER bit string length supported by the first node is 256 bits, and so on.

Of course, in practical applications, if a bit string length supported by the node is long enough, the bit string length may also be identified by multiple bytes.

According to an exemplary embodiment, a value of the BIER bit string length information identified by the new type of TLV occupies at least two bytes, each of the at least two bytes identifies a bit string length value or a specific number of bits in the at least two bytes identify a bit string length value.

In practical applications, the BIER bit string length information of the first node may be directly configured by the first node.

According to an exemplary embodiment, before block 201, the method may further include that the BIER bit string length information of the first node is acquired according to configuration information of the first node itself.

Of course, the BIER bit string length information of the first node may also be sent by a controller to the first node.

According to an exemplary embodiment, before block 201, the method may further include that the BIER bit string length information of the first node is acquired according to BIER bit string length information of the first node which is received from the controller.

Here, the controller refers to a controller in a layer 2 network, and the embodiments of the present disclosure do not limit specific implementations of the controller.

At block 202, the LLDPDU is sent to a second node.

Herein, the second node is an adjacent node of the first node.

The BIER bit string length information of the first node is used in forwarding of BIER traffic. In other words, when the forwarding of BIER traffic is performed, the second node may forward the BIER traffic according to the BIER bit string length information of the first node, that is, the second node may forward the BIER traffic to the first node according to the BIER bit string length information of the first node.

In order to implement a transmission of information of a node and functions of information of the node, the second node also need to perform operations corresponding to the operations of the first node.

Figure 4:
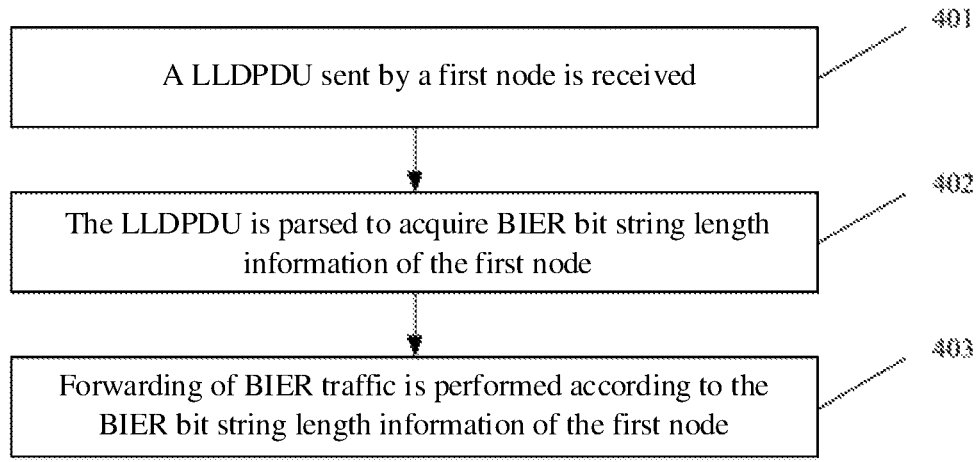
FIG. 4 is a schematic flowchart of an information processing method at a second node side according to the first embodiment of the present disclosure.

Therefore, the embodiments of the present disclosure provide an information processing method, specifically, an information transmission method, and more specifically, a method for transmitting information among nodes. The method is applied to a second node. As illustrated in FIG. 4, the method includes the following operations.

At block 401, a LLDPDU sent by a first node is received.

Herein, the first node is an adjacent node of the second node.

At block 402, the LLDPDU is parsed to acquire BIER bit string length information of the first node.

Herein, the BIER bit string length information of the first node is identified by a new type of TLV defined by a LLDP.

At block 403, forwarding of BIER traffic is performed according to the BIER bit string length information of the first node.

That is to say, when the forwarding of BIER traffic is performed, the second node forwards the BIER traffic according to the BIER bit length information of the first node, that is, the second node forwards the BIER traffic to the first node according to the BIER bit length information of the first node.

According to an exemplary embodiment, the second node modifies bit string length information of a BIER header according to the BIER bit string length information of the first node, so as to forward the BIER packet to the first node.

According to an exemplary embodiment, the second node modifies bit string length information of egress nodes in the BIER header according to the BIER bit string length information of the first node, so as to forward the BIER packet to the first node.

Figure 5:
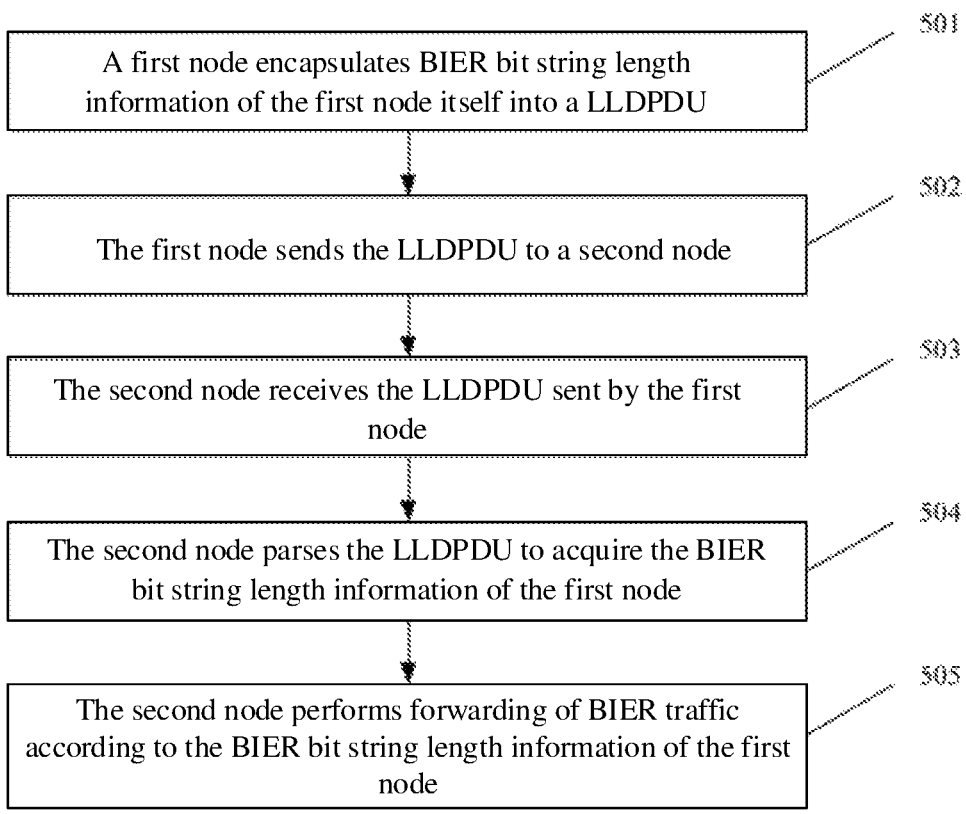
FIG. 5 is a schematic flowchart of an information processing method according to the first embodiment of the present disclosure.

The embodiments of the present disclosure further provide an information processing method. As illustrated in FIG. 5, the method includes the following operations.

At block 501, a first node encapsulates BIER bit string length information of the first node itself into a LLDPDU.

Herein, the BIER bit string length information of the first node is identified by a new type of TLV defined by a LLDP.

At block 502, the first node sends the LLDPDU to a second node.

Herein, the second node is an adjacent node of the first node.

In practical applications, the number of second nodes may be at least one second node according to a network topology relationship.

At block 503, the second node receives the LLDPDU sent by the first node.

At block 504, the second node parses the LLDPDU to acquire the BIER bit string length information of the first node.

At block 505, the second node performs forwarding of BIER traffic according to the BIER bit string length information of the first node.

Herein, it is to be noted that the specific processing process for the first node and the specific processing process for the second node have been described in detail above, and will not be elaborated herein again.

In the information processing method according to the embodiments of the present disclosure, a first node encapsulates BIER bit string length information of the first node into a LLDPDU, and sends the LLDPDU to a second node, the second node is an adjacent node of the first node. The second node receives the LLDPDU sent by the first node, parses the LLDPDU to acquire the BIER bit string length information of the first node, and perform forwarding of BIER traffic according to the BIER bit string length information of the first node. BIER bit string length information of a node is transmitted to an adjacent node in a network through the LLDPDU, and a transmission of the BIER bit string length information of nodes in a layer 2 network is implemented, so that a node can accurately know BIER bit string length information of an adjacent node and perform forwarding of traffic according to the BIER bit string length information of the adjacent node. In such way, traffic error handling or traffic loss caused by inconsistent bit string length processing capabilities of the nodes can be effectively avoided.

Second Embodiment

The embodiment describes a process for transmitting information among nodes in detail on the basis of the first embodiment.

Figure 6:
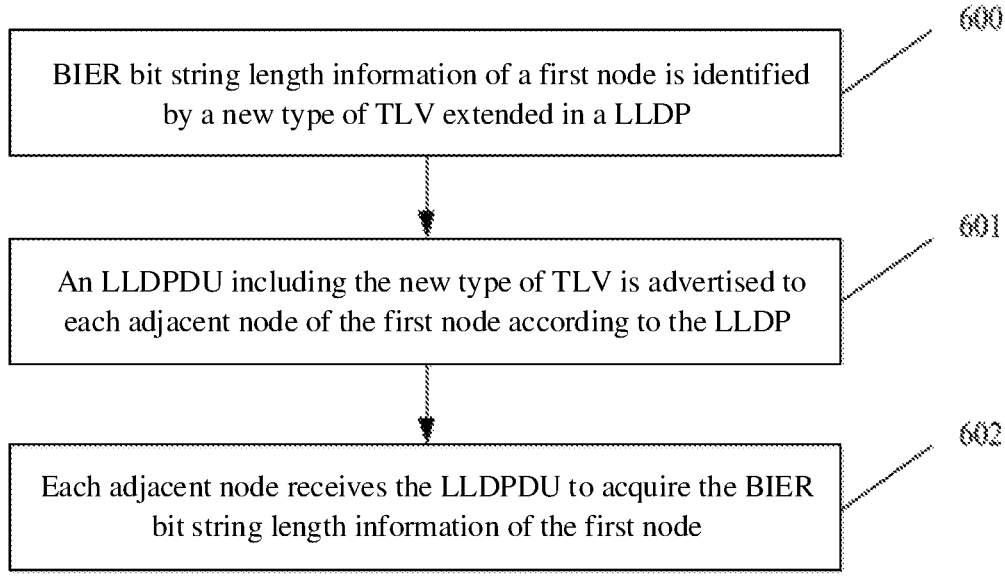
FIG. 6 is schematic flowchart of a process in which information is transmitted among nodes according to a second embodiment of the present disclosure.

As illustrated in FIG. 6, the process mainly includes the follow operations.

At block 600, BIER bit string length information of a first node is identified by a new type of TLV extended in a LLDP.

Herein, a value of the new type of TLV that identifies the BIER bit string length information of the first node may be a specific bit string length value, or may be several specific bit string length values. That is, the value of the new type of TLV may be at least one specific bit string length value. For example, it is possible to list only a bit string length value, such as 128, that the first node most desires to process. Optionally, it is possible to list multiple bit string length values, such as 128, 256 and 512, that can be supported by the first node.

Herein, in practical applications, the BIER bit string length information of the first node may be directly configured by the first node, or may also be sent by a controller.

At block 601, the first node advertises, according to the LLDP, to each adjacent node of the first node an LLDPDU including the new type of TLV.

Herein, the new type of TLV identifies the BIER bit string length information of the first node.

At block 602, each adjacent node receives the LLDPDU to acquire the BIER bit string length information of the first node.

Each adjacent node may perform forwarding of BIER traffic according to a BIER bit string length value supported by the first node. For example, each adjacent node may modify a bit string encapsulation length of a BIER header during the forwarding.

For example, for a layer 2 network illustrated in FIG. 1, a Node 3 advertises, through a new type of TLV extended in the LLDP, to a Node 1 BIER bit string length information (128 bits) supported by the Node 3. When the Node 1 performs the forwarding of traffic, the Node 1 modifies bit string length information of an egress node in the BIER header of a packet sent to the Node 3 to 128 bits, so that the Node 3 can correctly process the BIER packet and correctly implement the forwarding.

It can be seen from the above description that in the solutions of the embodiments of the present disclosure, the LLDP technology is combined with the BIER technology, and BIER bit string length information supported by a node is carried in an extended TLV in the LLDP and is sent to adjacent nodes in the network, so that a transmission of BIER bit string length information of nodes in the layer 2 network is implemented, and traffic error handling or traffic loss due to inconsistent bit string length processing capabilities of the nodes is avoided. In this manner, when a node forwards traffic encapsulated by the BIER header, the node can perform a bit string encapsulation of the BIER header according to processing capability of the next node, thereby avoiding traffic handling error or traffic loss due to inconsistent bit string length support information of the nodes.

The solutions according to the embodiments of the present disclosure greatly improve the application of the BIER technology in the Layer 2 network, and improve the reliability and scalability of the network.

Third Embodiment

The embodiment describes a process for transmitting information at each node in detail by taking a layer 2 network illustrated in FIG. 1 for an example on the basis of the second embodiment.

Figure 7:
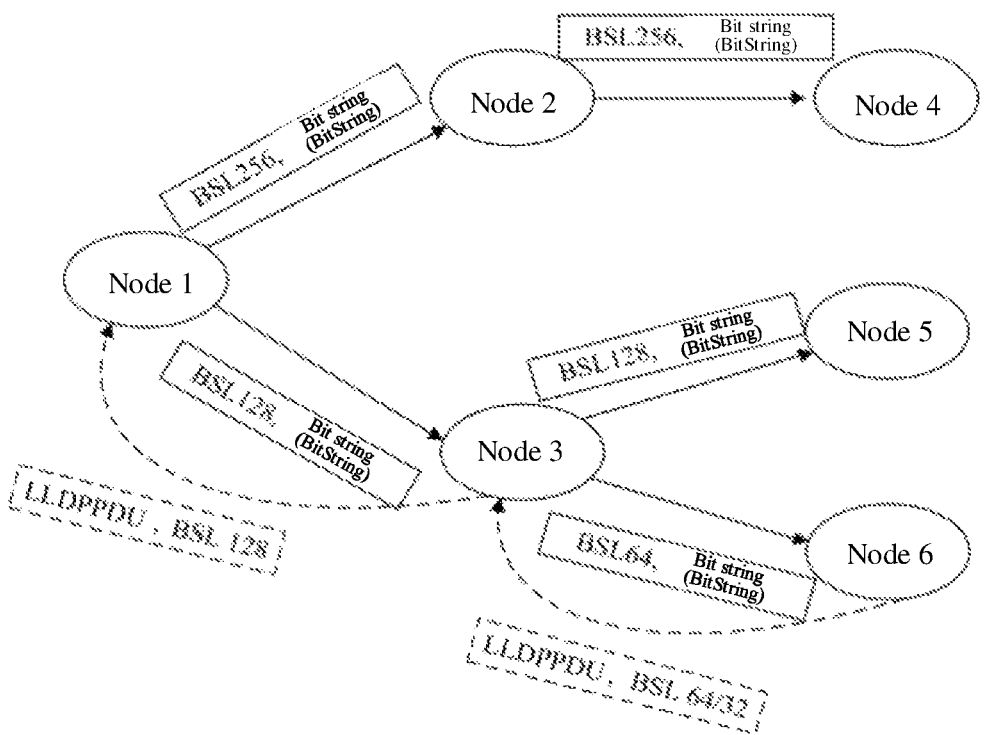
FIG. 7 is a schematic diagram of a process in which information is transmitted among nodes in a layer 2 network illustrated in FIG. 1 according to a third embodiment of the present invention.

As illustrated in FIG. 7, BIER bit string length information of a node is advertised between nodes by using an extension of a LLDP. For example, as denoted by the dotted lines in FIG. 7, a Node 6 advertises BIER bit string length information (i.e., 64/32 bits) supported by the Node 6 to a Node 3, and the Node 3 advertises BIER bit string length information (i.e., 128 bits) supported by the Node 3 to a Node 1. In fact, advertisements of the Node 3 and the Node 6 herein are only partial examples. In fact, each node will exchange BIER bit string length information supported by the node with other nodes, but the exchange is not limited to exchange between two nodes. That is to say, other nodes in FIG. 7 also advertise to adjacent nodes BIER bit string length information supported by the other nodes themselves. Thus, each node will know BIER bit string length supported by its adjacent nodes.

During the forwarding of traffic, the Node 1 adjusts, according to BIER bit string support condition (i.e., 128 bits) of the Node 3, a bit string length of a BIER header of a packet sent by the Node 1 to 128 bits. Similarly, the Node 3 adjusts, according to BIER bit string support condition of the Node 6, a bit string length of a BIER header of a packet sent by the Node 3 to 64 bits. As a result, there is no longer a case where traffic error handling or traffic loss is caused due to error handling of the Node 3 and the Node 6.

Fourth Embodiment

The embodiment describes how to identify information of a node by a new type of TLV on the basis of the first embodiment, the second embodiment and the third embodiment.

A new type of TLV that identifies BIER bit string length information of a node may be an entirely new TLV, or may be a new TLV obtained by adding BIER bit string length information into an existing TLV. When the BIER bit string length information of the node is identified, as illustrated in FIG. 3, a value for identifying the BIER bit string length information occupies one byte, and each bit in the one byte is used to identify a bit string length. For example, starting from the least significant bit (i.e. the right-hand), the first bit identifies that the BIER bit string length supported by the first node is 64 bits, the second bit identifies that the BIER bit string length supported by the first node is 128 bits, and the third bit identifies that the BIER bit string length supported by the first node is 256 bits, and so on. Of course, in practical applications, because of different device implementations and application scenarios, the minimum bit string length may also start from 32 bits or 16 bits, which is not limited in the embodiments of the present disclosure. Similarly, if a bit string length supported by a node is long enough, the bit string length may also be identified by multiple bytes.

Figure 8:
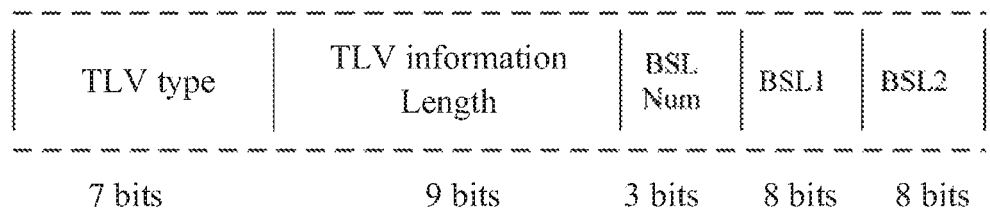
FIG. 8 is a schematic structural diagram of another new type of extended TLV according to an embodiment of the present disclosure.

In practical applications, as illustrated in FIG. 8, in a TLV described in FIG. 8, a total number of bit string lengths as well as specific bit string length values are listed. This method is also just an example and is not a complete definition of a format.

Fifth Embodiment

Figure 9:
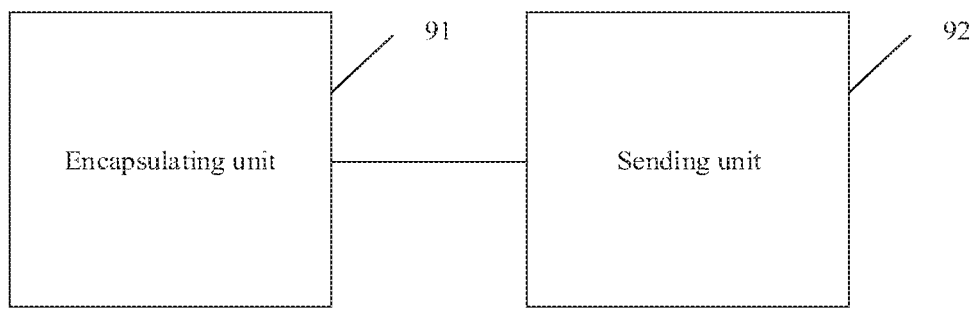
FIG. 9 is a schematic structural diagram of an information processing device provided in a first node according to a fifth embodiment of the present disclosure.

In order to implement the method of the embodiments of the present disclosure, the embodiments of the present disclosure provides an information processing device, specifically, an information transmission device, and more specifically, a device in which information is transmitted among nodes. The device is provided in a first node. As illustrated in FIG. 9, the device includes an encapsulating unit 91 and a sending unit 92.

The encapsulating unit 91 is configured to encapsulate BIER bit string length information of the first node into a LLDPDU.

The sending unit 92 is configured to send the LLDPDU to a second node. The second node is an adjacent node of the first node.

Herein, the BIER bit string length information of the first node is used in forwarding of BIER traffic.

Herein, The BIER bit string length information of the first node is identified by a new type of TLV defined by a LLDP.

Herein, in practical applications, the new type of TLV refers to a new type of TLV defined by an extension of the LLDP on the basis of an existing LLDP. The new type of TLV may be an entirely new TLV, or may be a new TLV obtained by adding BIER bit string length information into an existing TLV.

According to an exemplary embodiment, a value of the BIER bit string length information identified by the new type of TLV may be at least one specific bit string length value supported by the first node.

For example, it is possible to list only a bit string length value, such as 128, that the first node most desires to process. Optionally, it is possible to list multiple bit string length values, such as 128, 256 and 512, that can be supported by the first node.

According to an exemplary embodiment, a value of the BIER bit string length information identified by the new type of TLV occupies one byte, each bit in the one byte identifies a bit string length value.

For example, a TLV as illustrated in FIG. 3, a value for identifying the BIER bit string length information occupies one byte in the TLV, and each bit in the one byte is used to identify a bit string length. For example, starting from the least significant bit (i.e., the right-hand), the first bit identifies that the BIER bit string length supported by the first node is 64 bits, the second bit identifies that the BIER bit string length supported by the first node is 128 bits, and the third bit identifies that the BIER bit string length supported by the first node is 256 bits, and so on.

Of course, in practical applications, if a bit string length supported by the node is long enough, the bit string length may also be identified by multiple bytes.

According to an exemplary embodiment, a value of the BIER bit string length information identified by the new type of TLV occupies at least two bytes, each of the at least two bytes identifies a bit string length value or a specific number of bits in the at least two bytes identify a bit string length value.

In practical applications, the BIER bit string length information of the first node may be directly configured by the first node.

According to an exemplary embodiment, the device may further include an acquisition unit.

The acquisition unit is configured to acquire the BIER bit string length information of the first node according to configuration information of the first node itself.

Of course, the BIER bit string length information of the first node may also be sent by a controller to the first node.

According to an exemplary embodiment, the acquisition unit is configured to acquire the BIER bit string length information of the first node according to the BIER bit string length information of the first node which is received from the controller.

Here, the controller refers to a controller in a layer 2 network, and the embodiments of the present disclosure do not limit specific implementations of the controller.

The BIER bit string length information of the first node is used in forwarding of BIER traffic. In other words, when the forwarding of BIER traffic is performed, the second node may forward the BIER traffic according to the BIER bit string length information of the first node, that is, the second node may forward the BIER traffic to the first node according to the BIER bit string length information of the first node.

In practical applications, the encapsulating unit 91 and the acquisition unit may be implemented by a central processing unit (CPU), a micro control unit (MCU), a digital signal processor (DSP), or a field-programmable gate array (FPGA) in the information processing device. The sending unit 92 may be implemented by a transceiver in the information processing device.

Figure 10:
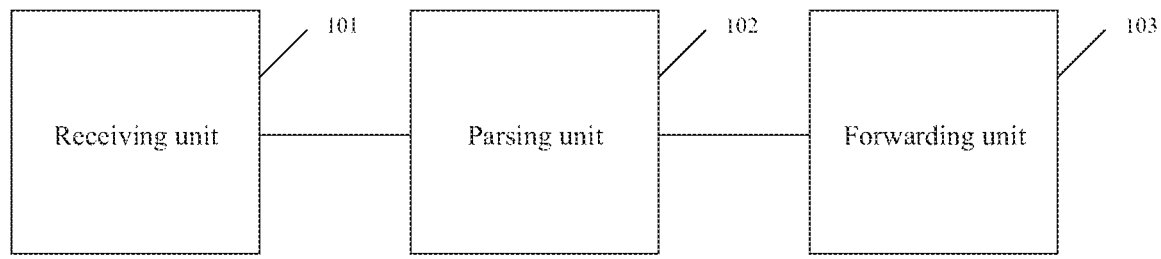
FIG. 10 is a schematic structural diagram of an information processing device provided in a second node according to the fifth embodiment of the present disclosure.

In order to implement the method of the embodiments of the present disclosure, the embodiments of the present disclosure provides an information processing device, specifically, an information transmission device, and more specifically, a device in which information is transmitted among nodes. The device is provided in a second node. As illustrated in FIG. 10, the device includes a receiving unit 101, a parsing unit 102 and a forwarding unit 103.

The receiving unit is configured to receive a LLDPDU sent by a first node.

The parsing unit is configured to parse the LLDPDU to acquire BIER bit string length information of the first node.

The forwarding unit is configured to perform forwarding of BIER traffic according to the BIER bit string length information of the first node.

Herein, the first node is an adjacent node of the second node.

That is to say, when the forwarding of BIER traffic is performed, the forwarding unit is configured to forward the BIER traffic according to the BIER bit length information of the first node, that is, the forwarding unit is configured to forward to the first node according to the BIER bit length information of the first node.

Herein, in practical applications, the BIER bit string length information of the first node is identified by a new type of TLV defined by a LLDP.

The forwarding unit 103 is specifically configured to modify bit string length information of a BIER header according to the BIER bit string length information of the first node, so as to forward BIER packet to the first node.

More specifically, the forwarding unit 103 is configured to modify bit string length information of egress nodes in the BIER header according to the BIER bit string length information of the first node, so as to forward the BIER packet to the first node.

In practical applications, the receiving unit 101 may be implemented by a transceiver in the information processing device. The parsing unit 102 may be implemented by a CPU, a MCU, a DSP or a FPGA in the information processing device. The forwarding unit 103 may be implemented by a transceiver in the information processing device in conjunction with a CPU, a MCU, a DSP or a FPGA in the information processing device.

Figure 11:
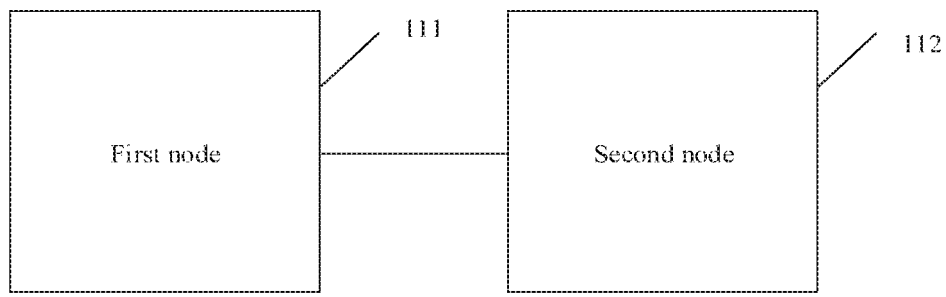
FIG. 11 is a schematic structural diagram of an information processing system according to the fifth embodiment of the present disclosure.

In order to implement the method of the embodiments of the present disclosure, the embodiments of the present disclosure provides an information processing system. As illustrated in FIG. 11, the system includes a first node 111 and a second node 112.

The first node 111 is configured to encapsulate BIER bit string length information of the first node into a LLDPDU, and send the LLDPDU to the second node 112.

The second node 112 is configured to receive the LLDPDU sent by the first node 111, parse the LLDPDU to acquire the BIER bit string length information of the first node, and perform forwarding of BIER traffic according to the BIER bit string length information of the first node.

Herein, the second node 112 is an adjacent node of the first node 111.

Herein, the BIER bit string length information of the first node may be identified by a new type of TLV defined by a LLDP.

It is to be noted that specific processing processes for the first node 111 and the second node 112 have been described in detail above, and are not elaborated herein again.

It is also to be noted that terms "first", "second" and the like in the embodiments of the present disclosure are used to distinguish similar objects, and are not necessarily used to describe a specific order or a chronological order.

Those skilled in the art will appreciate that the embodiments of the present disclosure may be provided as a method, a system, or a computer program product. Therefore, the present disclosure may take the form of a hardware embodiment, a software embodiment, or an embodiment combining software and hardware aspects. Moreover, the present disclosure may take the form of a computer program product embodied on one or more computer-usable storage medium (including, but not limited to, disk storage, optical storage, and so on) having stored thereon computer-usable program codes.

The present disclosure has been described with reference to flowcharts and/or block diagrams of methods, device (system) and computer program products according to the embodiments of the present disclosure. It should be understood that each flow or block in the flowcharts and/or the block diagrams and a combination of flows and blocks in the flowcharts and/or the block diagrams may be implemented by computer program instructions. The computer program instructions may be provided to a processor of a general purpose computer, a special purpose computer, an embedded processor, or other programmable data processing devices to produce a machine, such that instructions, which are executed by the processor of a computer or other programmable data processing devices, create apparatus for implementing the functions specified in one or more flows in the flowcharts and/or one or more blocks in the block diagrams.

The computer program instructions may also be stored in a computer-readable storage medium that directs a computer or other programmable data processing devices to operate in a particular manner, so that the instructions stored in the computer-readable storage medium produce an article of manufacture including instruction apparatus. The instruction apparatus implements the function specified in one or more flows in the flowcharts and/or one or more blocks in the block diagrams.

The computer program instructions may also be loaded onto a computer or other programmable data processing devices to cause a series of operations to be performed on the computer or other programmable data processing devices to produce a computer implemented process, so that instructions which are executed on the computer or other programmable data processing devices provide operations for implementing the functions specified in one or more flows in the flowcharts and/or one or more blocks in the block diagrams.

The above descriptions are only the preferred embodiments of the present disclosure and are not intended to limit the scope of the present disclosure.

INDUSTRIAL APPLICABILITY

The technical solutions according to the embodiments of the present disclosure relate to communication technologies. Through the technical solutions according to the embodiments of the present disclosure, a transmission of BIER bit string length information of nodes in a layer 2 network is implemented, so that a node can accurately know BIER bit string length information of an adjacent node and perform forwarding of traffic according to the BIER bit string length information of the adjacent node, thereby effectively avoiding traffic error handling or traffic loss due to inconsistent bit string length processing capabilities of the nodes.

The invention claimed is:

1. A method for processing information, the method being applied to a first node and comprising:
encapsulating bit indexed explicit replication (BIER) bit string length information of the first node into a link layer discovery protocol data unit (LLDPDU); and
sending the LLDPDU to a second node, the second node being an adjacent node of the first node, wherein
the BIER bit string length information of the first node is used in forwarding of BIER traffic by the second node by modifying bit string length information of a BIER header according to the BIER bit string length information of the first node.

2. The method of claim 1, wherein the BIER bit string length information of the first node is identified by a new type of type-length-value (TLV) defined by a link layer discovery protocol (LLDP).

3. The method of claim 2, wherein a value of the BIER bit string length information identified by the new type of TLV is at least one specific bit string length value.

4. The method of claim 2, wherein a value of the BIER bit string length information identified by the new type of TLV occupies one byte in the new type of TLV, each bit in the one byte identifies a bit string length value.

5. The method of claim 2, wherein a value of the BIER bit string length information identified by the new type of TLV occupies at least two bytes in the new type of TLV, each of the at least two bytes identifies a bit string length value or a specific number of bits in the at least two bytes identify a bit string length value.

6. The method of claim 1, further comprising:
acquiring the BIER bit string length information of the first node according to configuration information of the first node itself.

7. The method of claim 1, further comprising:
acquiring the BIER bit string length information of the first node according to BIER bit string length information, which is received from a controller, of the first node.

8. The method of claim 1, wherein the BIER bit string length information of the first node is identified by a new type of type-length-value (TLV) defined by a link layer discovery protocol (LLDP); and
wherein a value of the BIER bit string length information identified by the new type of TLV is a bit string length value that the first node most desires to process.

9. A method for processing information, the method being applied to a second node and comprising:
receiving a link layer discovery protocol data unit (LLDPDU) sent by a first node;
parsing the LLDPDU to acquire bit indexed explicit replication (BIERS bit string length information of the first node; and
performing forwarding of BIER traffic according to the BIER bit string length information of the first node, wherein
the first node is an adjacent node of the second node, and
wherein the performing forwarding of BIER traffic according to the BIER bit string length information of the first node comprises:
modifying bit string length information of a BIER header according to the BIER bit string length information of the first node.

10. The method of claim 9, wherein the BIER bit string length information of the first node is identified by a new type of type-length-value (TLV) defined by a link layer discovery protocol (LLDP).

11. The method of claim 9, wherein the BIER bit string length information of the first node is identified by a new type of type-length-value (TLV) defined by a link layer discovery protocol (LLDP); and
wherein a value of the BIER bit string length information identified by the new type of TLV is a bit string length value that the first node most desires to process.

12. A device of a first node for processing information, comprising:
a processor; and
a memory storing instructions executable by the processor,
wherein the processor is configured to encapsulate bit indexed explicit replication (BIER) bit string length information of the first node into a link layer discovery protocol data unit (LLDPDU); and send the LLDPDU to a second node, the second node being an adjacent node of the first node, wherein the BIER bit string length information of the first node is used in forwarding of BIER traffic by the second node by modifying bit string length information of a BIER header according to the BIER bit string length information of the first node.

13. The device of claim 12, wherein the processor is further configured to acquire the BIER bit string length information of the first node according to configuration information of the first node itself.

14. The device of claim 12, wherein the processor is further configured to acquire the BIER bit string length information of the first node according to BIER bit string length information, which is received from a controller, of the first node.

15. The device of claim 12, wherein the BIER bit string length information of the first node is identified by a new type of type-length-value (TLV) defined by a link layer discovery protocol (LLDP).

16. The device of claim 15, wherein a value of the BIER bit string length information identified by the new type of TLV is at least one specific bit string length value.

17. The device of claim 15, wherein a value of the BIER bit string length information identified by the new type of TLV occupies one byte in the new type of TLV, each bit in the one byte identifies a bit string length value.

18. The device of claim 15, wherein a value of the BIER bit string length information identified by the new type of TLV occupies at least two bytes in the new type of TLV, each of the at least two bytes identifies a bit string length value or a specific number of bits in the at least two bytes identify a bit string length value.

19. A device of a second node for processing information, comprising:
  a processor; and
  a memory storing instructions executable by the processor,
  wherein the processor is configured to receive a link layer discovery protocol data unit (LLDPDU) sent by a first node;
  parse the LLDPDU to acquire bit indexed explicit replication (BIER) bit string length information of the first node; and
  perform forwarding of BIER traffic according to the BIER bit string length information of the first node, wherein the first node is an adjacent node of the second node, and
  wherein the processor is further configured to modify bit string length information of a BIER header according to the BIER bit string length information of the first node.

20. The device of claim 19, wherein the BIER bit string length information of the first node is identified by a new type of type-length-value (TLV) defined by a link layer discovery protocol (LLDP).

* * * * *